United States Patent [19]

Porter

[11] Patent Number: 5,150,771

[45] Date of Patent: Sep. 29, 1992

[54] COIL SPRING OR FRICTION-LOCK MECHANISMS

[75] Inventor: Clyde R. Porter, Los Angeles, Calif.

[73] Assignee: P. L. Porter Company, Woodland Hills, Calif.

[21] Appl. No.: 522,210

[22] Filed: May 11, 1990

[51] Int. Cl.⁵ ............................................ B65H 59/10
[52] U.S. Cl. ................................... 188/67; 188/77 W
[58] Field of Search .................... 188/67, 77 W, 77 R; 192/81 C, 81 R

[56] References Cited

U.S. PATENT DOCUMENTS 4,577,730 3/1986 Porter .................................. 188/67

4,823,919 4/1989 Hayatdavoudi ...................... 188/67

Primary Examiner—Matthew C. Graham
Attorney, Agent, or Firm—Beehler & Pavitt

[57] ABSTRACT

A mechanical lock of the type where as spring wound about a rod normally grips the rod against axial movement through a lock housing is improved by providing a lightly scored surface finish on contacting surfaces of the rod and the spring, the scoring being transverse to the rod and excluding contacting surfaces of adjacent coils of the spring for enhanced frictional resistance to axial sliding displacement of the rod through the spring while maintaining low friction unwinding of the spring.

2 Claims, 3 Drawing Sheets

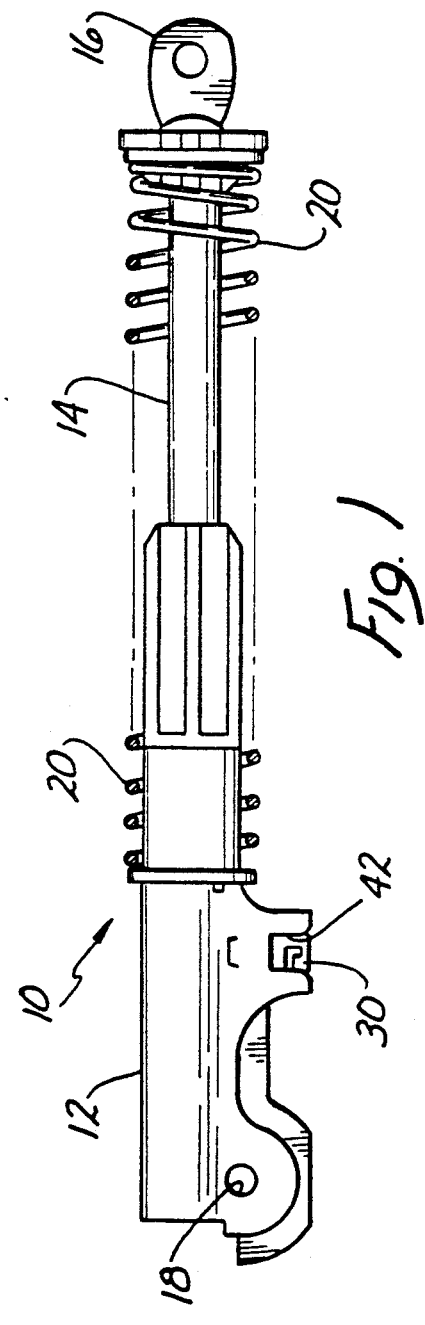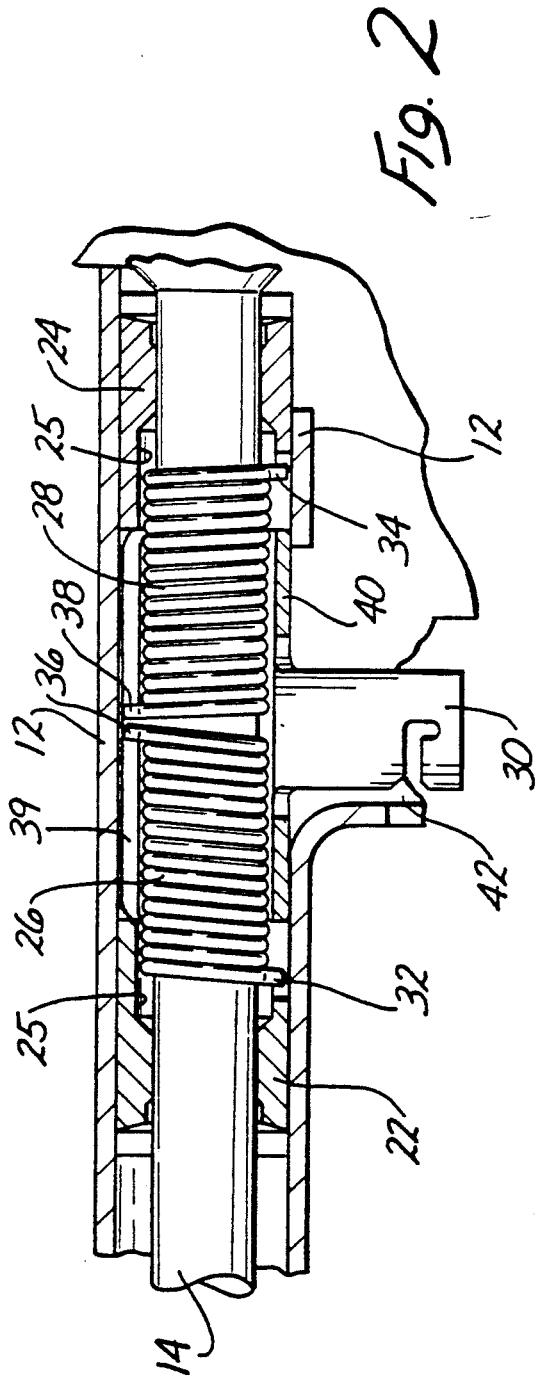

COIL SPRING OR FRICTION-LOCK MECHANISMS

BACKGROUND OF THE INVENTION

1. Field of the Invention

This invention pertains to the field of mechanical locking devices and in particular relates to certain improvements in infinitely positionable mechanical locks of the type where a rod axially displaceable through a housing is normally clamped against axial motion by coiled springs and is released by partially unwinding the springs.

23. State of the Prior Art

Infinitely positionable locking devices of the friction brake type are known in which a rod is locked with respect to the housing but where the device can be selectively actuated to an unlocked state in which such axial rod motion through the housing is enabled. One, and perhaps two, coil springs are axially fixed within a housing coaxially with the rod. The springs normally grip the curved surface of the rod to prevent the rod from moving with respect to the housing. An actuation lever permits an operator to partially unwind the springs, thereby increasing the inside diameter thereof so that the springs no longer grip the rod, which may then be moved freely axially within the coiled springs and consequently relative to the housing. In the case of a dual spring lock, two springs are disposed coaxially about a rod on either side of a central actuating lever. Each spring has a distal end engaged to one of two fixed locking bushings located at opposite ends of a housing sleeve. The interaction of the last two or three coils at the end of each spring with an angled seat surface on the corresponding bushing is responsible for the locking effect. A load tending to push the rod through the housing drives one of the springs against the angled bushing surface. As a result the last few coils of the spring are biased or canted to a locking angle against the rod. One of the springs operates to lock the rod to the housing in tension and the other locks it in compression.

Various locking devices based on principle are known, such as described in U.S. Pat. Nos. 3,874,480, 4,457,406 and 4,577,730, all owned by the assignee of this patent. Other devices of this type are described in U.S. Pat. No. 2,434,480 to Anderson issued Jan. 13, 1948, U.S. Pat. No. 3,320,590 issued to Kedem, U.S. Pat. No. 3,249,180 issued May 3, 1977 to Torossian, U.S. Pat. No. 2,429,383 to Arens, and U.S. Pat. No. 3,064,766 to Hanizesk.

These friction locks are widely used in the automotive industry for the control of reclinable seats. In early designs of these locks a phenomenon known as "walking" of the rod was observed when the device was subjected to cyclic load reversals, characterized by an incremental creeping of the rod through the lock housing. Such a cycle may consist of, for example, a seat occupant pushing back on the backrest of a seat followed by a forward force on the backrest during deceleration of the vehicle. It can also be induced by travel over rough roads. Certain improvements have largely overcome this problem for current applications of these devices. For example, in U.S. Pat. No. 4,577,730 to Porter et al., "walking" and "snap noise" are minimized or substantially eliminated by the expedient of pre-biasing the coils of the locking springs against the rod even in the absence of any load on the lock mechanism.

Nevertheless, under extreme laboratory conditions, "walking" of the rod can still be observed at cyclic load levels and frequencies substantially above those encountered in current applications of these devices. In order to extend use of these locks to ever more demanding applications, such as in very high performance vehicles, improvement is desirable.

Previous practice in friction locks has been to use springs made of smooth round wire, while the rod is given a relatively smooth surface finish by, for example, a centerless grinding process. The ground rod typically exhibits a smooth but very finely textured surface characterized by fine score lines of random length but uniformly aligned in a circumferential direction, i.e. transverse to the rod axis. Consequently, the spring surfaces gripping the rod are considerably smoother than the rod surface. In order to obtain adequate frictional locking force between the springs and the rod it has often been necessary to deliberately produce a sufficiently rough finish on the rod surface which could be gripped by the springs without slipping. While roughening of the rod surface can achieve this end, it can also cause an annoying snapping noise due to jerky engagement and disengagement of the springs and rod. This does not affect the load bearing capacity of the lock, but it is desirable to achieve smoother and quieter operation of the lock.

Ideally, the solution to these shortcomings should be adaptable to a wide variety of friction locks of the type described above with a minimum of redesign or additional components.

BRIEF SUMMARY OF THE INVENTION

This invention addresses the aforementioned needs by providing an improvement useful in a wide variety of friction locks of the general type having a housing, a rod axially slidable through the housing, one or more coil springs about the rod, where the springs have a normal inside diameter for gripping the rod surface and thereby locking the rod against movement through the housing, and a release for unwinding the springs to an unlocking condition of enlarged inside diameter sufficient to allow sliding movement of the rod.

The rod surface is finely scored in a direction generally transverse to the rod axis, and the spring has rod contacting coil surfaces roughened to an extent comparable to the rod surface. The roughening of the spring coil surfaces is preferably limited to coil surfaces which do not come into contact with each other. Thus, where adjacent coil turns touch each other, the surfaces are smooth so as not to interfere with easy sliding contact between adjacent coils as the springs are unwound to release the rod by actuation of the release mechanism, or conversely, are allowed to wind to their normal locking condition. In round wire springs the coil surface scoring may be limited to less than 180 degrees of arc about the wire axis and oriented towards the rod, that is, on the interior, rod-facing surfaces so as to maintain smooth, low friction contact surfaces along areas of contact with adjacent coils.

It is preferred to abrasively roughen the spring surfaces to produce fine longitudinal scoring of the spring wire, which in the helical geometry of the coil spring, is generally parallel to the scoring on the rod surface. This treatment of the spring inside surfaces selectively enhances the locking of the rod against axial displacement through the spring by virtue of mating and interlocking of the opposing scored surfaces. In a circumferential direction relatively little increase in frictional engagement is introduced by the spring surface scoring because in that direction the ridges and grooves of the opposing scored surfaces merely slide along each other without interlocking.

An important benefit of this improvement is that the rod can now be given a finer surface finish for a given load resistance of the lock, all other factors being constant. This is because the added spring surface roughness contributes significantly to the locking effect and the rod surface need not provide as much of the friction as in previous designs. In quieter lock operation, and allows a shorter stroke of the grinding more easily produces the finer surface finishes, resulting in less costly and less critical manufacture of the rod.

Selective scoring of the inside spring surfaces may be accomplished by introducing abrasive material into the coil spring and applying the abrasive material in a circular motion generally following the coils of the spring. For example, rolled-up emery paper can be inserted axially into the coil spring and the coil turned against the abrasive sheet.

For volume production, the spring wire can be treated before coiling into the spring by first longitudinally scoring the surface of the wire, and then winding the wire to make the coil spring. Longitudinal pre-scoring of the wire may be done by drawing the wire longitudinally across an abrasive surface while pressing the wire against the abrasive, as with a pressure roller. This procedure brings only part of the wire circumference into contact with the abrasive material and can easily confine the abrasion to a portion of the surface of the wire spanning less than 180 degrees of the wire circumference, while the circumferential remainder of the wire surface retains a smooth or polished finish.

This invention therefore provides a relatively simple low-cost expedient for improving the performance of friction locks of the aforedescribed type without substantial modification or redesign of the lock mechanism.

These and other features and advantages of this invention will be better understood from the following detailed description considered with reference to the accompanying drawings.

BRIEF DESCRIPTION OF THE DRAWINGS

FIG. 1 is a side view of a typical mechanical lock of the type improved by the present invention;

FIG. 2 is a longitudinal section showing the main elements of a dual spring friction lock mechanism such as featured in the device of FIG. 1;

DETAILED DESCRIPTION OF THE PREFERRED EMBODIMENTS

Figure 3:
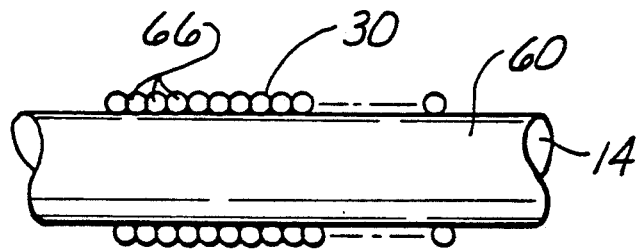
FIG. 3 is a longitudinal section as in FIG. 2 but showing only one spring on a rod segment.

With reference to the drawings, FIG. 1 shows a commercially available infinitely positionable mechanical lock 10 sold as Part No. MM65-1016D by P. L. Porter Company of Woodland Hills, Calif. This particular device is selected by way of example only for purposes of explanation of the improvement which constitutes this invention. The mechanical lock 10 includes a cylindrical rod 14 slidable through a lock housing 12. A lug 16 at the end of the rod is fastened to a first element of a structure such as a reclinable seat, while the lock housing 12 is fastened to another element of this structure movable relative to the first by means of a bolt passing through an eye 18 in the lock housing. An external coil spring 20 is in compression between the lug end of the rod 14 and the lock housing 12, biasing the rod 14 to the extended position shown in FIG. 1. By actuating a release mechanism described below, the rod can be moved through the housing, downwardly in FIG. 1.

The construction and operation of such a mechanism is described and illustrated in detail in U.S. Pat. No. 4,577,730, and also in an earlier patent U.S. Pat. No. 3,874,480, both to this applicant.

For clarity of explanation of the improvement disclosed below, a summary description of the mechanical lock 10 will be made with reference to FIG. 2, which is a fragmentary longitudinal section of the lock of FIG. 1. The lock housing 12 is made of two complementary half-shells. In FIG. 2, the upper half-shell has been removed, showing the rod 14 extending through two locking bushings 22 and 24 fixed to the lock housing 12. Two coil springs 26, 28 coaxial with the rod 14 are disposed each between a release lever 30 and one of the fixed bushings 22, 24. The springs 26, 28 are tightly wound in opposite directions on each side of the release lever 30 and terminate at their distal ends in short tangs 32, 34 which are engaged within a notch formed in each of the fixed locking bushings so as to hold the coil end from rotating about the rod 14. The inner ends of the two coils likewise terminate in tangs 36, 38 engaged in a longitudinal slot 39 cut in a cylindrical sleeve 40. The sleeve 40 fits with a slight tolerance over and rotates relative to the two springs 26, 28. The springs normally have a reduced diameter for tightly gripping the rod 14 and preventing axial movement of the rod through the bushings and consequently through the housing 12. The actuating lever is integral with the sleeve 40 and extends radially through an opening 42 defined in the lock housing 12, as best seen in FIG. 1.

By turning the lever 30 in a given direction about the rod 14, the inner spring tangs 36, 38 are rotated relative to the rod, partly unwinding the two springs to a condition of enlarged inside diameter freeing the rod 14 for axial displacement. The sleeve 40 tends to control and distribute evenly the enlargement of the spring coils from the inner ends towards the outer ends, to prevent non-uniform expansion of the spring coils when the lever 30 is actuated.

Each of the bushings 22, 24 has a counterbore 25 in which are seated the coils nearest to the distal end of each spring. The bottom of each counterbore defines a tapered surface or spring seat which is angled relative to the spring axis. One of the springs operates to lock the rod in compression of the lock 10 while the other spring locks the rod for a load acting in tension. The angled bottoms of these bushing bores operate to bias the outermost coils of each spring at a locking angle relative to the rod 14 whenever a load is applied urging the rod and one of the springs against the angled surface. The spring coils driven against this angled bushing surface become cocked or biased to a more acute angle relative to the rod, into frictional locking engagement with the rod 14. In other words, if the rod 14 is pushed to the right relative to the housing 12, the angled spring seat surface on bushing 22, the coils of spring 26 become cocked from a natural helical angle relative to the rod 14 into an increased, unnatural helical angle which causes the spring coils to more firmly grip the rod 14 and prevent its movement towards the right, so long as the lever 13 is not actuated. Conversely, if a load is placed on the rod 14 tending to drive the rod towards the left in FIG. 2 relative to the housing 12, bushing 24 has a similar effect on the spring 28, which then prevents movement of the rod 14 in that direction. When the release lever 30 is actuated to bring about a relatively small rotation of the sleeve 40, the inside diameter of both springs is enlarged and the rod 14 is released from locking engagement.

The foregoing description of the construction and operation of the friction lock 10 is sufficient for understanding of the improvement described below, as the general operation of these locks is well known. A more detailed description and illustration of the arrangement of the springs in the bushing counterbores and other aspects of the device will be found in the aforementioned patents issued to this applicant, particularly in U.S. Pat. No. 4,577,730.

In mechanical friction locks of this type the coil springs are generally made of polished round steel wire. The smooth surfaced spring coils have a tendency to skeet along the rod surface, resulting in "walking" of the rod through the lock housing under certain circumstances and in "snap noise" of the lock.

As best understood at this time, the "walking" phenomenon can be traced to a slight slippage of the outermost coil of the spring when it is being biased into a locking condition by the angled seat surface of the adjacent bushing. For an initial load acting, e.g., in compression on the lock 10 (driving the rod 14 into housing 12), the coils of spring 28 adjacent the bushing are biased or cocked towards the left, and the wire of the last coil rolls on the rod due to a sliding condition of the last coil against the slanted seat surface on the bushing, while the spring grips the rod. The coils on the other spring, on the tension side of the lock, will follow the motion and slide slightly to the left along the rod 14 since the spring on the tension side of the lock is gripping but not firmly cocked against the rod 14 under these conditions. When the load on rod 14 is now reversed, and the tension coil is now cocked by the respective bushing, it will lock against the rod 14 at a new place further to the left than the original position of the rod 14 relative to the housing 12. Subsequent load reversal cycles will cause incremental movement of the rod relative to the housing 12.

It has been found by this applicant that these and other shortcomings can be substantially reduced or eliminated by selectively roughening the rod contacting surfaces of the coil springs. This roughening preferably achieves a surface finish similar in texture and surface roughness to the finish of the rod surface 60, and oriented in general alignment with the scoring of the rod surface.

The improvement of this invention will now be described with reference to FIGS. 3–6 of the drawings. FIG. 3 is a longitudinal section of segment of the rod 14 extending through one of the coil springs, arbitrarily designated as coil 30.

The cylindrical surface 60 of the rod 14 finished by centerless grinding has a smooth but finely textured surface characterized by micro-grooves or score lines of random length oriented in a circumferential direction on the rod surface. The individual score lines are the result of random scoring by individual particles of abrasive material on the grinding wheels used in the centerless grinding process. The rod surface is finished to a degree of smoothness such that the scoring of the surface is not readily visible to the unaided eye. Specifically, the surface finish r.m.s. (root mean square, a standard measure of surface finish) may range between 15 and 50 AA.

Figure 4:
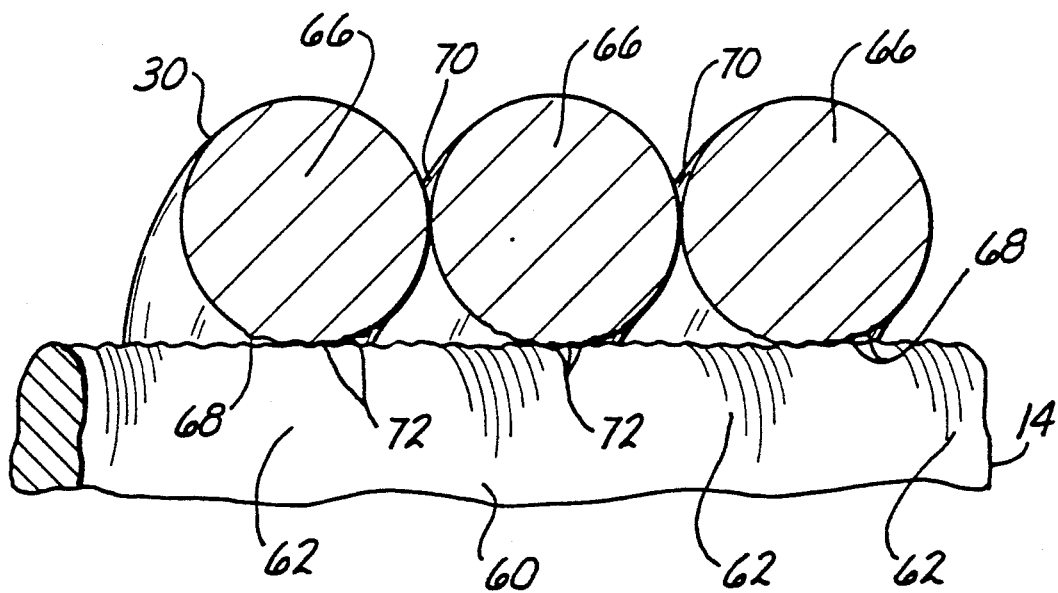
FIG. 4 a detail of the FIG. 3 view enlarged to show the scoring on three coils of the spring and on the rod surface.

Turn now to FIG. 4, which is an enlarged detail of FIG. 3 showing the scoring 62 of the rod surface 60. The individual score lines 62 define on a near microscopic scale parallel crests or ridges of random length about the rod circumference. The coil spring 30 is made of cylindrical wire and three coils 66 of spring wire are shown in cross section gripping the rod surface 60. Each coil turn 66 has an inside surface portion 68 which generally faces the rod surface 60 and part of which actually which engages the rod 14 in the coils are tightly wound, with each coil 66 making contact with an adjacent coil 66 on either side at a region 70 in FIGS. 4 and 5. The contact between adjacent coils extends along a helically shaped region running the length of the spring 30 between the coils. Whenever the coil spring is unwound by actuation of the unlocking lever 30 so as to release the rod 14, there occurs a sliding contact between adjacent coils along the contact region 70. For smooth, low effort operation of the release lever 30, it is desirable that the coil surfaces be smooth along the region 70 of mutual contact.

Figure 5:
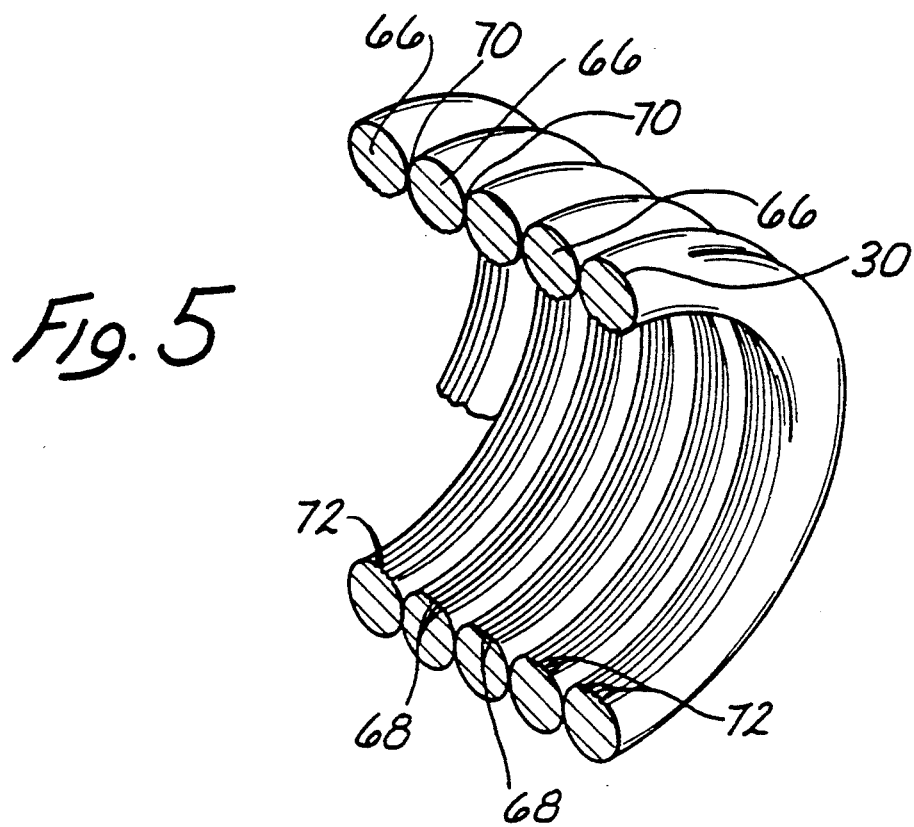
FIG. 5 is a fragmentary view of the spring interior showing the longitudinal scoring of the inside coil surfaces.
Figure 6:
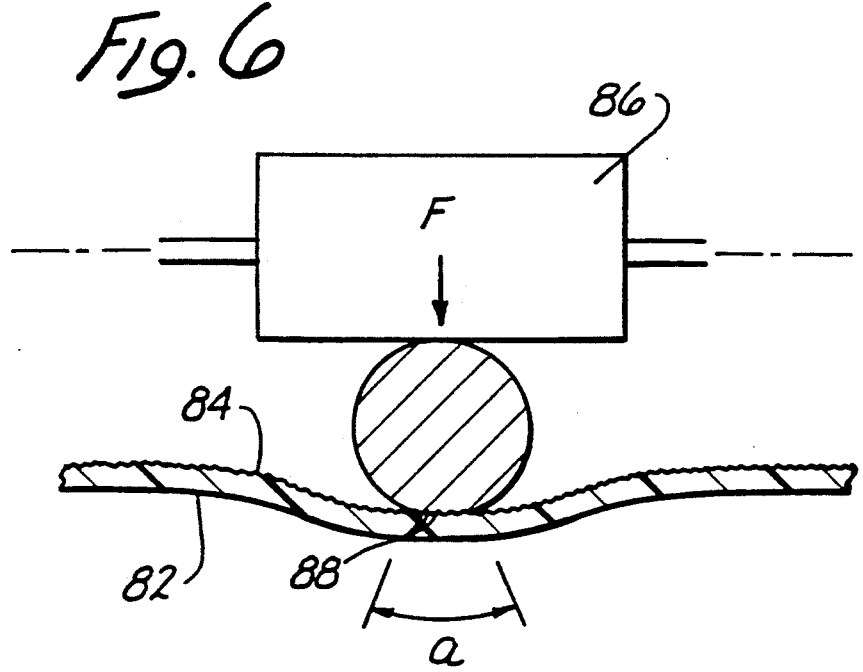
FIG. 6 illustrates an arrangement for longitudinally scoring a limited circumferential surface on spring wire by drawing the wire across an abrasive medium prior to winding of the coil spring.

The inside surfaces 68 of the coils, by contrast, are abraded in a selective manner, as preferred at this time, to form fine score lines 72 longitudinally on the spring wire. The longitudinal scoring of the wire follows the helical geometry of the spring and consequently become generally circumferential to the rod 14 and thus generally parallel to the annular score lines 62 on the rod surface 60. In FIG. 5 the surface grooving and score lines 72 have been exaggerated in size relative to the wire diameter for clarity of illustration, to better show the arrangement and orientation of the score lines 72 on the inner surfaces 68 of the individual coil turns 66. In reality, the individual score lines are difficult to discern with the unaided eye.

As currently preferred, texturing or scoring of both the rod surface 60 and the inner coil surfaces 68 is in the range of 15 to 50 r.m.s., with the spring surfaces approximately similar in roughness to the finish of the rod surface.

The effect of the scoring of the contacting surfaces of the spring 30 and rod 14 is such that in the normal, gripping condition of the coil spring 30, the micro-grooves and micro-ridges defined by the score lines 72 on the coil surfaces 68 tend to mate with and interlock in a random manner with micro-grooves and micro-ridge lines defined by score lines 62 on the rod surface 60. This interlocking is directionally selective in that it enhances friction against axial displacement of the rod through the spring without comparably increasing friction in a circumferential direction as the spring winds and unwinds against the rod surface. This is because in the latter case, the ridges and grooves on the spring coils simply slide along opposing grooves and ridges on the rod surface. Likewise, friction between adjacent coil turns 66 is not increased because the coil surface scoring is limited to the inner coil surfaces 68 facing the rod 14. The surface scoring of the coil 66 is limited to a portion 68 of the coil surface spanning less than 180 degrees of arc along the circumference of the spring wire, which section 68 faces the rod on the inside of the coil spring and includes the coil surface portion which actually contacts the rod surface. It is presently preferred that the scoring extend over an area of the spring wire surface centered on the contact point between the wire and the rod surface and spanning approximately 30 to 40 degrees of arc of the wire circumference, i.e. the abraded area 68 extending approximately 15 to 20 degrees circumferentially on either side of the contact point or contact area between the wire and the rod. The scored area 68 actually defines a helical ribbon extending along the inner surface of the coil spring 30.

The abrasive scoring of the coil spring interior can be achieved by introducing an abrasive material, such as a rolled sheet of emery paper, into the coil spring and then rotating the spring back and forth against the rolled abrasive paper. 40 grit emery paper has been found to produce surface scoring generally comparable to the rod surface finish achieved by centerless grinding. While such manual abrading of the coil spring interior is difficult to standardize, and the resulting finish will depend on the duration of the abrasive treatment, the pressure exerted between the abrasive material and the spring, and other factors, generally a short treatment involving a few turns of the spring relative to the emery paper at moderate, manually applied pressures will be effective in removing the smooth polish of the spring wire and result in a reasonable match to the ground rod surface.

Tests were conducted with the specified P. L. Porter locking device of FIG. 1. Production parts were selected at random and the springs in each of five locks were treated with 40 grit emery paper by the procedure just described. These five improved locks were then tested together with five similar but unmodified production locks. All ten devices were subjected to cyclic load reversals of 850 lbs. forward loading followed by approximately 164 lbs. reverse loading. A specimen was considered to pass the test if it successfully resisted without failure 25,000 load cycles. The results are shown in Table 1 below.

TABLE 1

| Test # | Forward Load | Reverse Load | #Passed v. #Tested |
|---|---|---|---|
| Unmodified Production MM65-1016 locks | | | |
| 1 | 850 | 167 | 2 / 5 |
| 2 | 850 | 234 | 0 / 5 |
| Modified MM65-1016 locks | | | |
|  | 850 | 167 | 5 / 5 |

For volume production of mechanical locks improved in accordance with this invention, the spring wire may be scored longitudinally over a circumferentially limited section of the wire surface before the wire is wound into the coil spring. This may be achieved by, for example, drawing the wire between a supply spool and a take-up spool across a moving belt of abrasive material, such as 40 grit emery paper, while the wire is pressed against the abrasive surface by means of a pressure roller. This arrangement is illustrated in FIG. 7. The wire 80, seen in axial cross-section, is pressed into a sheet 82 of emery paper or equivalent material coated with abrasive material 84. The contact between the wire 80 and the abrasive surface 84 is limited to an arc measured by angle A, which is controllable by, e.g., adjusting the downward pressure on the wire 80, by providing suitable shaped support surfaces under the sheet 82, or by any other suitable means. Pressure roller 86 applies downward force F against the wire 80 pressing the wire against the abrasive surface 84. As the wire 80 is drawn along a direction perpendicular to the plane of FIG. 6, the grit material 84 will cut or scratch longitudinally oriented score lines 88 of random length but generally parallel to each other in a circumferential surface section encompassed within the angle$_a$ of the wire 80, which angle defines the width of the abraded surface portion 68 of the coils in FIGS. 4 and The treated wire 80 is then formed into a coil spring while maintaining the orientation of the scored area 68 of the wire towards the interior of the coil spring, to complete a finished coil spring scored in the manner shown in FIGS. 4 and 5.

It will be clear that this invention is not limited to any particular method or process for achieving the abrasively scored or grooved surfaces on either the rod or the coil spring surfaces. While the finish of the rod surface can be conveniently achieved by centerless grinding, suitable surface scoring of the rod may be obtained by various other known machining processes or surface treatments. Likewise, the surface scoring of the spring coils may be achieved in a manner other than described above without thereby departing from the scope of this invention. Although certain preferred ranges of surface finish have been specified, some or all of the advantages described above may be obtained with surface finishes outside the specified ranges.

It will be further understood that the improvement described and illustrated herein is not limited to the particular locking device of FIG. 1, but is generally applicable to any friction locking devices wherein a rod is gripped by a spring fixed to a lock housing so as to hold the rod against axial displacement through the lock housing and having a release mechanism for partially unwinding the spring or springs so as to enlarge the internal diameter of the spring and release the rod for axial displacement through the lock housing.

While a particular embodiment and particular methods for practicing the present invention have been described and illustrated, it must be understood that many changes, substitutions and modifications will become apparent to persons possessed of ordinary skill in the art without thereby departing from the scope and spirit of the present invention, which is defined by the following claims.

What is claimed is:

1. In a mechanical lock of the type having a housing, a cylindrical rod axially slidable through said housing, a coil spring of cylindrical wire helically wound about said rod and having a normal spring internal diameter for engaging the rod surface and thereby locking said rod against movement through said housing, and means for unwinding said coil spring to an unlocking condition, of enlarged internal diameter sufficient to allow sliding movement of said rod, the improvement wherein:

said rod surface has a surface finish characterized by circumferential scoring in the range of 15 to 50 R.M.S.; and said coil spring has coil surfaces scored longitudinally along the coil windings, the scored surfaces extending less than 180 degrees of arc about the wire axis, said scored coil surfaces facing said rod surface, said coil spring including non-scored sliding contact surfaces between adjacent coils of said spring;

such that interlocking occurs between the rod and coil scored surfaces in said locking condition to enhance locking of said rod against axial movement through said coil spring while preserving low friction contact between adjacent coils for smooth winding and unwinding of the spring during actuation of the lock.

2. In a mechanical lock of the type having a housing, a rod axially slidable through said housing, said rod having a cylindrical surface finish by centerline grinding and characterized by circumferential scoring in the range of 15 to 50 R.M.S., a coil spring of wire wound about said rod having a normal spring internal diameter for engaging the rod surface and thereby locking said rod against movement through said housing, and means for unwinding said coil spring to an unlocking condition of enlarged internal diameter sufficient to allow sliding movement of said rod, the improvement wherein:

said coil spring has coil surfaces scored in a direction longitudinal to the coil turns to a surface finish in the range of 15 to 50 R.M.S.;

the scored coil surfaces being limited to coil surfaces facing said rod surface, said coil spring including non-scored sliding contact surfaces between adjacent coils of said spring, said scored and nonscored coil surfaces being circumferentially adjacent on said wire;

such that enhanced interlocking occurs between the rod and coil scored surfaces in said locking condition without hindering the winding and unwinding of said coil spring by said scored coil surfaces.

* * * * *